United States Patent
van der Laan et al.

(10) Patent No.: US 10,527,438 B2
(45) Date of Patent: Jan. 7, 2020

(54) METHOD FOR ASSOCIATING A HAZARD WITH A ZONE OF A DIGITAL MAP

(71) Applicant: TomTom Traffic B.V., Amsterdam (NL)

(72) Inventors: Antoine Carl van der Laan, Lelystad (NL); Gunnar Schmidt, Berlin (DE)

(73) Assignee: TOMTOM TRAFFIC B.V., Amsterdam (NL)

( * ) Notice: Subject to any disclaimer, the term of this patent is extended or adjusted under 35 U.S.C. 154(b) by 198 days.

(21) Appl. No.: 15/121,776

(22) PCT Filed: Feb. 27, 2015

(86) PCT No.: PCT/EP2015/054142
§ 371 (c)(1),
(2) Date: Aug. 26, 2016

(87) PCT Pub. No.: WO2015/128466
PCT Pub. Date: Sep. 3, 2015

(65) Prior Publication Data
US 2017/0010113 A1    Jan. 12, 2017

(30) Foreign Application Priority Data
Feb. 27, 2014   (GB) .................................. 1403493.8

(51) Int. Cl.
*G01C 21/34* (2006.01)
*G01C 21/32* (2006.01)
(Continued)

(52) U.S. Cl.
CPC ......... *G01C 21/3461* (2013.01); *G01C 21/32* (2013.01); *G01C 21/3697* (2013.01); *G08G 1/0969* (2013.01)

(58) Field of Classification Search
CPC ................ G01C 21/32; G01C 21/3461; G01C 21/3697; G08G 1/096716; G08G 1/0969
See application file for complete search history.

(56) References Cited

U.S. PATENT DOCUMENTS 5,684,704 A * 11/1997 Okazaki ............ G01C 21/3446
701/25
6,675,085 B2    1/2004 Straub
(Continued)

FOREIGN PATENT DOCUMENTS

CN    101556159 A    10/2009
CN    102918359 A    2/2013
(Continued)

OTHER PUBLICATIONS

Search Report dated Aug. 7, 2014 for United Kingdom Patent Application No. 14034918.
(Continued)

*Primary Examiner* — Charles J Han (57) ABSTRACT

There is disclosed herein methods of operating a computing device, such as a server, to associate a hazard with a zone of a digital map. The method comprises the computing device: receiving data representative of a location of a hazard matched to a location on a digital map accessible to said computing device; and determining if the repository comprises data representative of a zone corresponding to a region of a digital map containing the location of the hazard, to which the hazard should be associated. If the repository does not comprise data representative of such a zone, the method further comprises generating data representative of a zone corresponding to a region of a digital map containing the location of the hazard, and storing the generated data representative of said zone in the data repository. There is also disclosed herein computing devices and software for carrying out these methods.

20 Claims, 6 Drawing Sheets

(51) Int. Cl.
G08G 1/0969 (2006.01)
G01C 21/36 (2006.01)

(56) References Cited

U.S. PATENT DOCUMENTS

| | | | |
|---|---|---|---|
| 6,798,354 | B2 | 9/2004 | Schuessler |
| 8,099,466 | B2 | 1/2012 | Tenereillo |
| 8,134,478 | B2 | 3/2012 | Denaro |
| 8,255,155 | B1* | 8/2012 | Crane .............. G08G 1/096716 340/905 |
| 2002/0022920 | A1 | 2/2002 | Straub |
| 2003/0090392 | A1* | 5/2003 | Schuessler ........... G08G 1/0965 340/988 |
| 2006/0075023 | A1 | 4/2006 | Tenereillo |
| 2009/0259396 | A1 | 10/2009 | He |
| 2009/0300035 | A1 | 12/2009 | Denaro |
| 2010/0070128 | A1* | 3/2010 | Johnson ........... G08G 1/096783 701/31.4 |
| 2011/0106429 | A1* | 5/2011 | Poppen .............. G01C 21/3476 701/533 |
| 2012/0179363 | A1 | 7/2012 | Pierfelice |
| 2012/0299702 | A1 | 11/2012 | Edara et al. |

FOREIGN PATENT DOCUMENTS

| | | |
|---|---|---|
| DE | 102011119544 B3 | 5/2013 |
| WO | 2013132033 A1 | 9/2013 |

OTHER PUBLICATIONS

International Search Report dated May 6, 2015 for International Application No. PCT/EP2015/054142.

* cited by examiner

METHOD FOR ASSOCIATING A HAZARD WITH A ZONE OF A DIGITAL MAP

CROSS-REFERENCE TO RELATED APPLICATIONS

The present application is a National Stage of International Application No. PCT/EP2015/054142, filed on Feb. 27, 2015, and designating the United States, which claims benefit to United Kingdom Patent Application 1403493.8 filed on Feb. 27, 2014. The entire content of these applications is incorporated herein by reference.

FIELD OF INVENTION

The present application, at least in some aspects, relates to methods and systems for associating a hazard with a zone of a digital map, and also generating and managing zones to be associated with hazards in a digital map. Further, the application relates to the managing and generation of zones by a server for communication to a mobile device, such as a portable navigation device.

BACKGROUND TO THE INVENTION

Mobile electronic devices such as smart phones, portable navigation devices (mobile device/PNDs) and integrated navigation systems that include GNSS (Global Navigation Satellite Systems) signal reception and processing functionality are well known and are widely employed as in-car or other vehicle navigation systems. In general terms, a known electronic device having navigation functionality comprises a processor, memory (at least one of volatile and non-volatile, and commonly both), and digital map data stored within said memory. The processor and memory cooperate to provide an execution environment in which a software operating system may be established, and additionally it is commonplace for one or more additional software programs to be provided to enable the functionality of the mobile device/PND to be controlled, and to provide various other functions.

Such devices also include a GNSS antenna, such as a GPS antenna, by means of which satellite-broadcast signals, including location data, can be received and subsequently processed to determine a current location of the device relevant to the digital map. The device may also include electronic gyroscopes and accelerometers which produce signals that can be processed to determine the current angular and linear acceleration. The determined acceleration may then be used in conjunction with location information derived from the GPS signal to determine the velocity and relative displacement of the device and thus vehicle in which it is typically mounted. Such sensors are most commonly provided in in-vehicle navigation systems, but may also be provided in the mobile device/PND itself.

In recent years, such devices have also been used in systems to alert drivers when they are approaching known locations of known hazards, such as that of speed enforcement devices (i.e. speed traps and enforcement cameras) and certain other hazards including road hazards, such as school zones, accident black spots, road works, and weather hazards such as black ice, snow, flooding and heavy rain, brush fires etc. Speed cameras are provided to slow traffic often at locations known to represent accident black spots, and may themselves represent hazards as other road users may brake suddenly and unexpectedly, which is a common response by some drivers when they see a speed enforcement device. Devices that warn a driver of the presence of a speed enforcement device improve the driver's safety since they warn the driver of the location of such hazards.

In such systems, a device having a GPS antenna and access to a database containing the location of hazards including speed traps, accident black spots, etc is typically provided in a vehicle. The device is configured to warn a driver when the vehicle, using the location information derived from the GPS signal, is approaching the location of a hazard stored in the database. One such system is described, for example, in WO 01/55744 A2. The locations of the hazards may be stored locally in a data repository of the mobile device/PND, but may be periodically updated at the mobile device/PND by, for example, the mobile device/PND receiving an update by wireless communication from a central server.

As will be appreciated by those skilled in the art, one of the important aspects of such systems is the accuracy and freshness of the information in the database. For example, it is undesirable to provide a warning to a user of a hazard such as a speed camera that is no longer present on the stretch of road, or to incorrectly indicate the speed limit on a stretch road associated with a speed camera in the database. In an effort to improve accuracy and freshness of such data, it is known to collect and utilise reports from drivers and other users indicating the presence or absence of speed cameras, and to provide this updated information to other members of the community in a real-time manner.

An example of one such system is the Trapster® application for mobile devices, and which is described in detail at www.trapster.com. In this application, all users of the app are asked to report or validate the status of speed traps, enforcement cameras and the like. As result of these reports, a digital map can be shown to a user with various icons and colours representing different trap types, and in some cases their associated confidence levels. For example: a green trap icon is displayed to indicate the presence of an unverified trap; a yellow trap icon is displayed to indicate that a trap has been verified by another user; a red trap icon is displayed to indicate that a trap has been verified by multiple users, and thus has the highest confidence level associated with it. The application also allows users to report other hazards, such as: police traps, e.g. an active sighting of a police speed trap, or a police vehicle currently observing traffic; construction zones, e.g. road works; brush fires; road closures; children at play; icy roads; etc. These hazards are shown to other users, again by means of an icon indicating a location on the digital map of the hazard stored in the database.

SUMMARY OF THE INVENTION

Embodiments of the invention provide computing devices, such as servers, and methods and software for operation thereof, for associating a hazard with a zone of a digital map.

Thus, viewed from one aspect, there is provided a method of operating a computing device, such as a server, to associate a hazard with a zone of a digital map, the computing device comprising one or more processors and a data repository, the method comprising:

receiving data representative of a location of a hazard matched to a location on a digital map accessible to said computing device;

determining if the repository comprises data representative of a zone corresponding to a region of a digital map containing the location of the hazard, to which the hazard should be associated; and, if the repository does not comprise data representative of such a zone, generating data representative of a zone corresponding to a region of a digital map containing the location of the hazard, and storing the generated data representative of said zone in the data repository.

The method, in preferred embodiments, further comprises causing data indicative of an association between said zone and said hazard to be transmitted to one or more portable navigation devices.

The present invention is a computer implemented invention. The means for carrying out any of the steps of the method may comprise a set of one or more processors configured, e.g. programmed, for doing so. A given step may be carried out using the same or a different set of processors to any other step. Any given step may be carried out using a combination of sets of processors.

The present inventors have recognised that, in certain situations and for certain types of hazard, it is beneficial or more appropriate to alert a user of a mobile device/PND to the presence of an actual or potential hazard on the basis of a zone, rather than a specific location for the hazard. For example, when an accident has occurred, it would be advantageous to be able to warn users of mobile device/PNDs of a potential traffic jam in a peripheral zone around the accident. Weather conditions, such as black ice or fog, also apply a zone rather than a single point location. Similarly, for mobile and fixed speed enforcement cameras, it may be advantageous to alert users that they are entering a zone in which a speed enforcement device is or may be operating, as this helps prepare the user throughout the zone for the sudden braking of other road users and helps ensure that the user's speed is appropriately reduced throughout the zone. Indeed, some countries, such as France, have legislated to preclude users of mobile device/PNDs from being notified of locations of speed enforcement cameras.

An important aspect of such hazard warning systems is the accuracy and freshness of the information in the database. For example, it is undesirable to provide a warning to a user of a speed enforcement device that is no longer present on the stretch of road, or to incorrectly indicate the speed limit on a stretch of road associated with a speed enforcement device in the database. As mentioned above, in an effort to improve accuracy and freshness of such data, it is known to collect and utilise reports from drivers and other users indicating the presence or absence of hazards, and to provide this updated information to other members of the community in a real-time manner.

In the abovementioned method, the received data representative of a location of a hazard matched to a location on a digital map accessible to said server may be derived from one or more reports from drivers, for example. The data may be reported from elsewhere, however, such as from a traffic control room or a weather, flooding or emergency reporting service. In this regard, the present invention provides a method by which a central server can monitor for incoming reports of hazards and either associate the hazard to an existing zone or generate a new zone which can then be communicated to mobile device/PNDs in use in the field, which can allow users of the mobile device/PNDs to be accurately warned of hazards on a zonal basis and in real time, on the basis of fresh information. This can also help avoid further accidents and traffic congestion.

Further, in accordance with the invention, the generation and storage of the zones, which is a processing intense activity, can be performed at a central server, with information concerning the individual zones being communicable to individual mobile device/PNDs on the basis of, for example, a planned route. This removes from the individual mobile device/PNDs the requirement for any local processing and storage capacity to be provisioned/burdened in order to perform any zone generation and creation. Indeed, the individual mobile device/PNDs only need to receive from the server an indication of a zone associated with a hazard in order to alert a user of the hazard on a zonal basis. This avoids any significant processing and storage burden at the mobile devices/PNDs themselves. Advantageously, the server has greater processing resources than any of the mobile devices as well as greater storage capacity, so it is able to use a detailed and updatable database to generate each of the zones. The processing requirements and data storage requirements at mobile devices are therefore reduced.

Further still, the only information that has to be transmitted to a mobile device/PND to cause an alert to be provided is an indication of an association between a given zone (stored locally to a mobile device/PND) and a hazard, and not any point locations. Advantageously, it is not necessary to transmit numerous point locations to mobile device/PNDs when new hazards are detected and, by only transmitting information on zones local to a mobile device/PND or a planned route of a mobile device/PND, or new or updated zones, there is no unnecessary increase in traffic over the communications network.

Further still, a database of zones is generated and maintained at the server, and when a report is received of a hazard that is located in an existing zone stored in the database, that zone may be used by associating the zone with the hazard. Hazard reports received for locations for which there is no zone stored in the database will cause the server to generate and store a new zone. In this way, in the invention, a database of hazard zones is created and maintained at the server, which can be reused in an effective and efficient way to notify users of mobile devices/PNDs of hazards on a zonal basis.

Thus, in embodiments, the method further comprises the server performing said method steps for plural hazards in real time in response to receipt of data representative of a location of each hazard. Further, in embodiments, the method further comprises the server causing data representative of one or more zones to be transmitted to a mobile device/portable navigation device based on a current location of the mobile device/portable navigation device or a route planned using said mobile device/portable navigation device.

In embodiments, the data representative of a zone stored in the data repository each indicate types of hazard with which that zone can be associated. In this way, different zones may be generated for one or more different types of hazard. For example, the server may store a zone generated for accident reports received at a given location in a digital map, but this zone may be significantly bigger than the zone generated for a report received of an active speed enforcement camera at the same location. When determining if the repository comprises data representative of a zone corresponding to a region of a digital map containing the location of the hazard, the server may further base said determination on data representative of the type of the hazard and an indication for each stored zone of the types of hazard with which that zone can be associated. Generating data representative of a zone corresponding to a region of a digital map containing the location of the hazard may comprise including in said data an indication types of hazard with which that zone can be associated.

Hazard types may include, inter alia and without limitation: fixed speed cameras, mobile speed cameras, average speed checks, red light cameras, accident reports, traffic jams, restricted traffic areas, weather hazards, ice, flooding, snow, rockfall, landslide, avalanche. The present invention is useful and effective in zone generation and alerting for each of the aforementioned hazard types.

In embodiments, a portable navigation device, in receipt of data indicative of an association between a zone and a hazard, provides an indication signal alerting the user to said hazard in relation to said zone. Said indication signal may be provided to said user based on a current location of said device in proximity to said zone.

In embodiments, each data representative of a zone has associated attributes. The method may further comprise the server setting values for the attributes associated with said zone based on said hazard. For example, for a speed enforcement camera report used to create a zone, the zone may have associated attributes of speed limit, confidence code (usable to indicate the confidence that the camera is active), latest report data, etc. These attributes may be updated each time a report is received that is associated with that zone.

In embodiments, the method further comprises the server determining if the repository comprises data representative of a zone corresponding to a region of a digital map containing the location of the hazard. If the repository does not comprise data representative of a zone corresponding to a region of a digital map containing the location of the hazard and the server determines that the repository does comprise data representative of a zone corresponding to a region of a digital map separated from the location of the hazard by a predetermined distance, the method may further comprise the server adjusting the zone to incorporate the location of the hazard and updating the stored data representing the zone. In this way, the server can monitor and adjust the shape of the zones to extend them to incorporate new locations of hazards proximate to the existing zone shape.

In embodiments, generating data representative of a zone corresponding to a region of a digital map containing the location of the hazard comprises the server: starting from the location of the hazard as a seed location and searching the digital map for a navigable route containing the seed location according to a set of rules for the zone, the route output by the search providing the zone. Searching the digital map for a navigable route containing the seed location may comprise the server: recursively performing a breadth first search on the network of navigable routes in the digital map for possible routes starting from the seed location; maintaining, for each route during the search, a score value as the sum of any penalty points generated based on the application of a set of search rules to the attributes of the road segments being searched; and if more than one route is output from the search, selecting the finished route having the lowest score as the zone. Using a searching algorithm on the road network in accordance with these embodiments allows a server to automatically generate effective zones for a hazard based on a report of a hazard location. Penalty points may be awarded to a route in dependence on one or more of: the occurrence of a change in functional road class; an angle between a road segment and the successor road segment at a junction in the network; the road segment being part of a roundabout. The penalty for each factor can be adjusted (even in dependence on hazard type) in order to ensure that viable and useful zones are automatically generated from each hazard location, without the need for any ongoing manual supervision.

The breadth first search may be optimised such that, during searching, the route in the network having the least penal score is continued first. This can avoid searching along unnecessary routes and can save a significant amount of processing time.

A search on a route of the possible routes may end in a finished route when the route exceeds a pre-defined path length. The pre-defined path length may be set in dependence on one or more of: the type or types of hazard the zone is to be associated with; whether or not the location is in an urban area; the functional road class. For example, accident reports received for locations on arterial routes may be used to generate zones 4 km or more in length along a motorway, whereas a report of a speed enforcement camera received for a location on a local road in an urban area may be used to generate a zone only 300 m in length.

In embodiments, a search on a route of the possible routes is abandoned and the route discarded if: the route turns out to be a dead end; or there already exists a finished route with a less penal score.

In embodiments, the road network is searched for routes in all possible directions from the seed location. A pre-defined path length for a search in a given direction may be based on an attribute that defines the relative position of the seed location in the zone and, optionally, if the hazard type is a speed camera, the direction of the camera. For example, a report received of an accident may require that the location of the accident is in the middle of the generated zone, whereas a speed enforcement camera in a one way road may require that the hazard appears at the end of the zone.

Viewed from another aspect, the present invention provides a computing device, such as a server, arranged to associate a hazard with a zone of a digital map, the computing device comprising:

means for receiving data representative of a location of a hazard matched to a location on a digital map accessible to said computing device;

means for determining if the repository comprises data representative of a zone corresponding to a region of a digital map containing the location of the hazard, to which the hazard should be associated; and means for, if the repository does not comprise data representative of such a zone, generating data representative of a zone corresponding to a region of a digital map containing the location of the hazard; and means for storing the generated data representative of said zone in the data repository.

The computing device, e.g. server, is preferably operably connected to a communication means arranged to cause data indicative of an association between said zone and said hazard to be transmitted to one or more portable navigation devices.

Any of the methods in accordance with the present invention may be implemented at least partially using software, e.g. computer programs. The present invention thus also extends to a computer program comprising computer readable instructions executable to perform a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the apparatus, it will be appreciated that any one or more or all of these operations may be performed in the method and by the apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the invention will now be described by way of example only, and with reference to FIGS. 1 to 8 of which.

DETAILED DESCRIPTION OF PREFERRED EMBODIMENTS

The description with respect to FIGS. 1 to 4 provides background information to facilitate understanding of the invention in its various embodiments. The embodiments of the invention are described by reference to FIGS. 5 to 8.

Preferred embodiments of the present invention will now be described with particular reference to a PND. It should be remembered, however, that the teachings of the present invention are not limited to PNDs but are instead universally applicable to any type of processing device that is configured to execute navigation software so as to provide route planning and navigation functionality. It follows therefore that in the context of the present document, a navigation device is intended to include (without limitation) any type of route planning and navigation device, irrespective of whether that device is embodied as a PND, a navigation device built into a vehicle, or indeed a computing resource (such as a portable personal computer (PC), mobile telephone, smart phone or portable digital assistant (PDA)) executing route planning and navigation software as a mobile device.

It will also be apparent from the following that the teachings of the present invention even have utility in circumstances where a user is not seeking instructions on how to navigate from one point to another, but merely wishes to be provided with a view of a given location or information about a current or upcoming location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
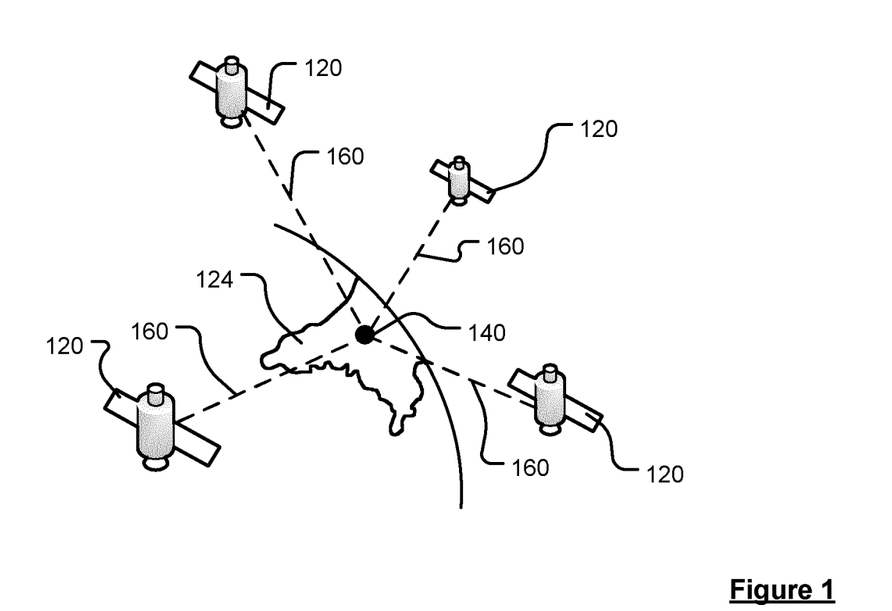
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
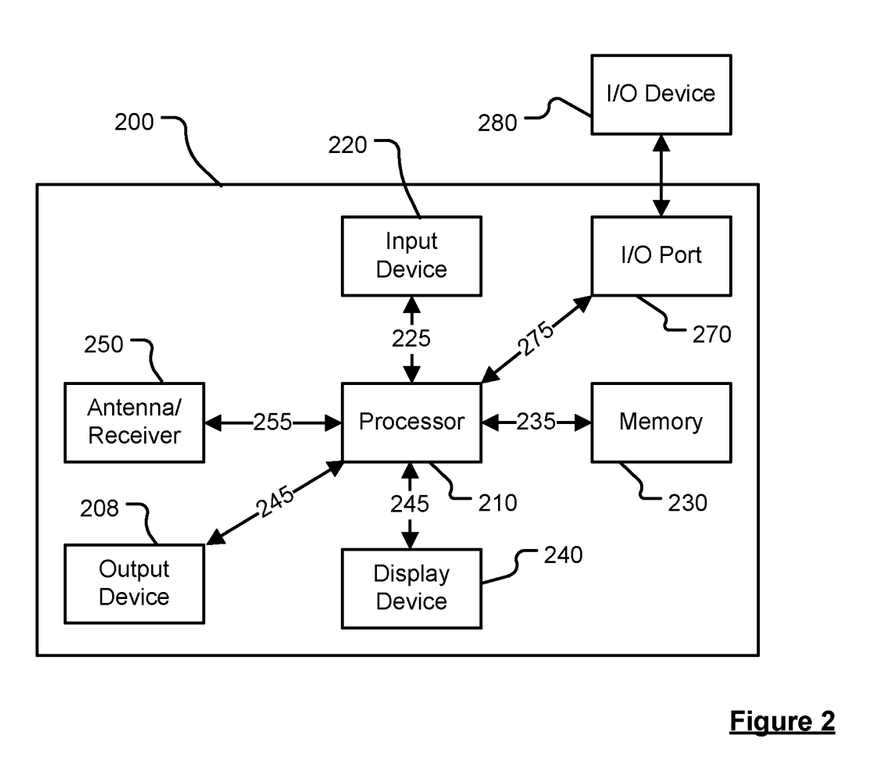
FIG. 2 is a schematic illustration of electronic components arranged to provide a navigation device.

FIG. 2 is an illustrative representation of electronic components of a mobile device operating as a portable navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilised to input information; and the display screen 240 can include any type of display screen such as an LCD display, for example. In a particularly preferred arrangement the input device 220 and display screen 240 are integrated into an integrated input and display device, including a touchpad or touchscreen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information for a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of a display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present document. For example, the components shown in FIG. 2 may be in communication with one another via wired and/or wireless connections and the like. Thus, the scope of the navigation device 200 of the present document includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Navigation device 200 may have a digital map stored locally on memory resource 230 in a data repository. The digital map may be displayed on a display of the navigation device 200 in use and may be usable to facilitate navigation and searching. The device 200 may indicate a current location of the device 200 on the map on the basis of the processed GPS signals. The device 200 may have a digital map stored locally on memory resource 230 in data repository navigable destinations as library of data records representative of locations relevant to a digital map. The device 200 may be usable to search for one or more routes on a navigable road network represented by the digital map, for example, from a current location of the device 200 to one of the navigable destinations stored locally on the memory resource 230. The device 200 may display the route and facilitate the user's navigation along the route by follow the position of the device along the route and providing navigation instructions.

Figure 3:
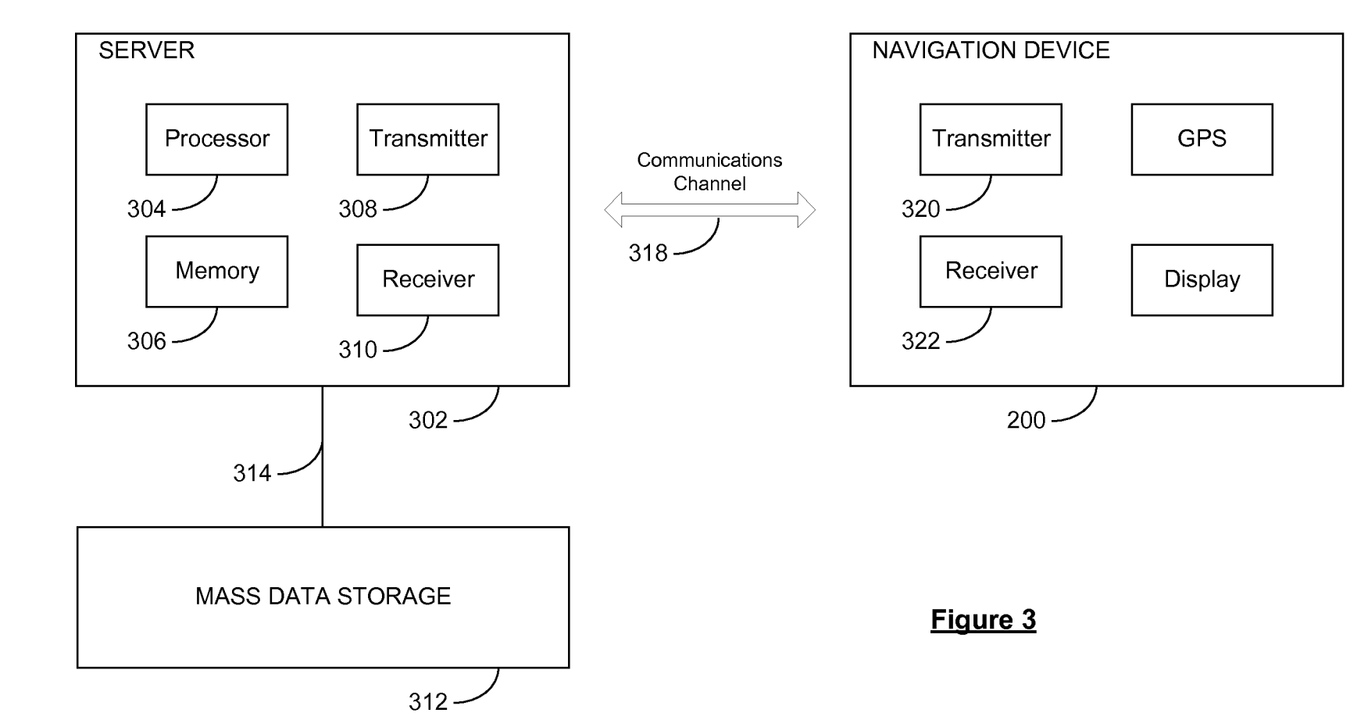
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilised which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as the GPRS, the Data Protocol Standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insertable card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and digital map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4:
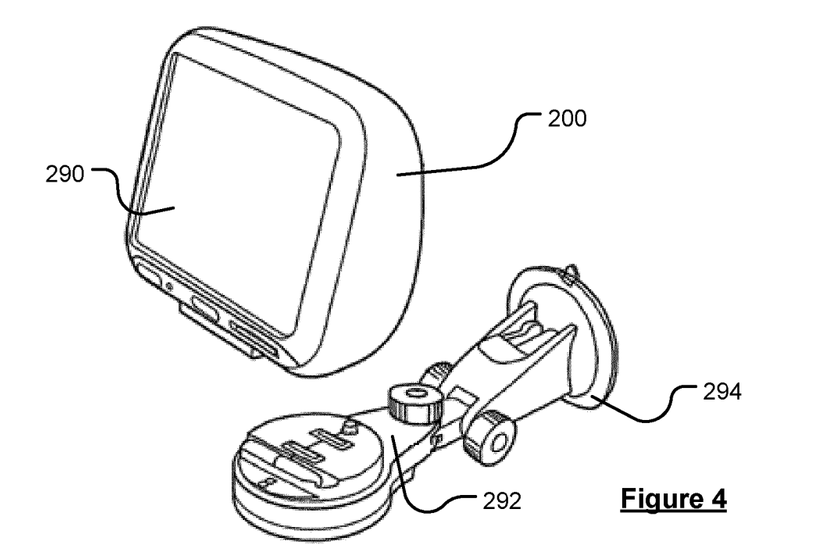
FIG. 4 are illustrative perspective views of a navigation device.

FIG. 4 is a perspective view of a navigation device 200. As shown in FIG. 4, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.). The navigation device 200 may sit on an arm 292, which itself may be secured to a vehicle dashboard, window, etc using a suction cup 294. This arm 292 is one example of a docking station to which the navigation device 200 can be docked. The navigation device 200 can be docked or otherwise connected to an arm 292 of the docking station by snap connecting the navigation device 292 to the arm 292 for example. To release the connection between the navigation device 200 and the docking station, a button on the navigation device 200 may be pressed, for example. Other equally suitable arrangements for coupling and decoupling the navigation device to a docking station are well known to persons of ordinary skill in the art.

Hazards encountered on the road network regularly change in location and become active and dormant. For example, due to their nature, speed cameras fit into this pattern. New fixed speed cameras are continually being installed, fixed speed cameras may be moved to a new location, and mobile speed cameras will often be in operation for short periods of time. Similarly, speed cameras will typically be active in certain sections of road. Hazards may in certain circumstances be located with a zonal distribution. For example, flooding will often reoccur in a floodplain zone surrounding a waterway, or black ice may regularly occur in depressions in the local topography. Similarly, accidents may frequently occur in a zone around an accident blackspot.

To provide adequate warning to users of mobile device/PNDs of the presence of hazards, embodiments of the present invention provide servers, methods and software for operation thereof for generating and maintaining hazard zones and associating a hazard with a zone of a digital map. The association between a hazard and a zone is then communicated by the server to mobile device/PNDs in the network which can then provide user alerts of hazards on a zonal basis. Embodiments of the present invention will now be described in more detail with reference to FIG. 5.

Figure 5:
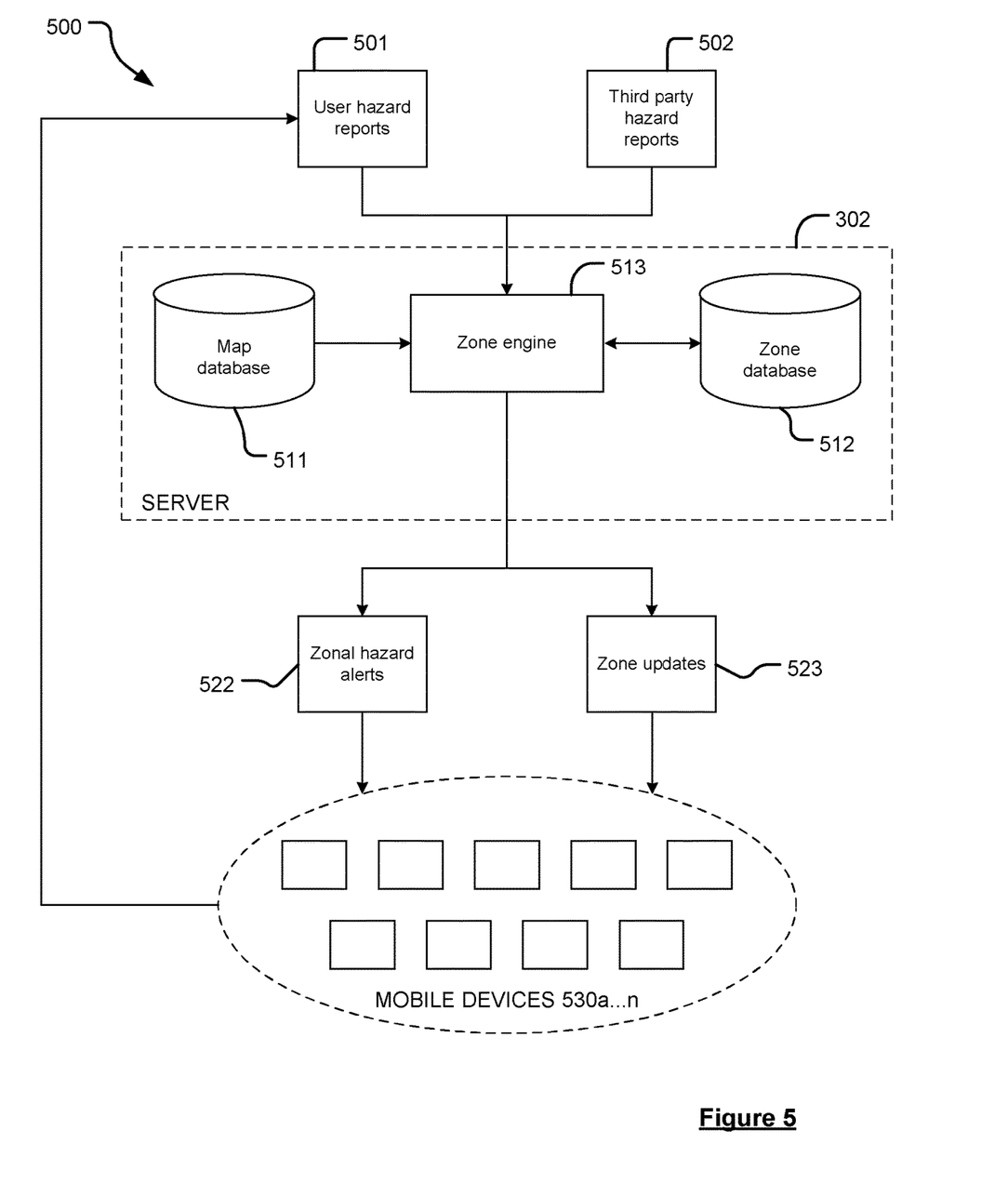
FIG. 5 is a schematic illustration of a system for facilitating navigation and route planning by users of mobile devices comprising a server for generating and maintaining zones of a digital map and associating hazards with zones to provide zonal hazard alerts to users in accordance with embodiments of the invention.

The server 302 configured in accordance with embodiments forms part of a system 500 for facilitating navigation and route planning by users of mobile devices 530a . . . n. As in FIG. 3, the server 302 is in data communication with the mobile devices 530a . . . n by a communications channel 318. The server comprises a zone engine 513 which may be a logical component instantiated by the one or more of the processors 304 of the server 302 executing instructions of a computer program product in accordance with embodiments of the invention, accessible to the server 302 by being stored in memory 306 or mass data storage 312. The mobile devices 530a . . . n are preferably portable navigation devices as described above, but can be any location-aware mobile devices, i.e. electronic mobile devices having means for determining its location, such as by using a global navigation satellite system (GNSS) receiver or a connection to a mobile telecommunication network.

The zone engine 513 is logically coupled to, and is capable of accessing data stored in, a map database 511 and a zone database 512. Map database 511 and zone database 512 may be stored in mass data storage 312. Map database 511 stores data relating to at least part of one or more digital maps usable by mobile devices 530a . . . n for navigation and route planning purposes.

The zone engine 513 serves to implement methods according to embodiments of the invention, described in detail below in relation to FIG. 6, for generating and maintaining in zone database 512 data relating to zones of a digital map (accessible in map database 511), and for associating a hazard with a zone of a digital map.

Reports of hazards are received at zone engine 513 in the form of user hazard reports 501 generated by mobile devices 530a . . . n or third party hazard reports 502 generated by third party data services such as weather reporting services, flood monitoring services, accident reporting services, etc (not shown). For example, when a user of a mobile device 530a . . . n observes a mobile speed camera or an accident, the mobile device can be operated to send to the server 302 a user hazard report 501 including, for example, the location (e.g. point location, such as defined by geographic coordinates, e.g. latitude and longitude) and/or type of hazard and/or some other details thereof.

When zone engine 513 is notified of an active hazard by way of one or more user hazard reports 501 or third party hazard reports 502, the zone engine 513, having access to map database 511 and zone database 512, finds in zone database 511 or generates and stores in zone database 511, a zone to be associated with the active hazard. Zone engine 513 then communicates a zonal hazard alert 522 to mobile devices 530a . . . n which may be in the form of data indicative of an association between the zone and the hazard.

The zone engine 513 may also serve to send, for example, on request, zone updates 523 to mobile devices 530a . . . n. The zone updates 523 contain data representative of the zones so that the mobile devices 530a . . . n can map the zones on to the digital map stored locally thereon. On receipt of a zonal hazard alert 522, the mobile devices 530a . . . n may show on a representation of the digital map on a display thereof the zone and one or more GUI elements indicative of the hazard and/or the mobile devices 530a . . . n may provide an auditory and/or visual alert to users of the hazard when the mobile device, based on GPS signals, enters the zone.

The zone updates 523 may be communicated to individual mobile devices 530*a* . . . *n* in response to requests received from a mobile device 530*a* . . . *n* based on a location or a planned route of the mobile device 530*a* . . . *n*.

The zones may each have at least one attribute, and typically a plurality of attributes, which may represent metadata stored in zone database 512 and transmitted to mobile devices 530*a* . . . *n* with zonal hazard alert 522 and/or zone updates 523. For example, a zone may have a "zone type" attribute representative of the type of hazard with which it can be associated. For zones further attributes relevant to zones that can be associated with speed camera hazards are, for example: a speed limit associated with the camera; the side of the road on which the speed camera is operational; and the type of the speed camera (e.g. a fixed camera, a mobile camera, part of an average speed trap); etc. Possible hazard types include, without limitation: fixed speed cameras, mobile speed cameras, average speed checks, red light cameras, accident reports, traffic jams, restricted traffic areas, weather hazards, ice, flooding, snow, rockfall, landslide, avalanche.

The zone engine 513 may also adapt existing zones to incorporate the locations of hazards should the a report of a hazard be received having a location within a predetermined distance of an existing zone.

Figure 6:
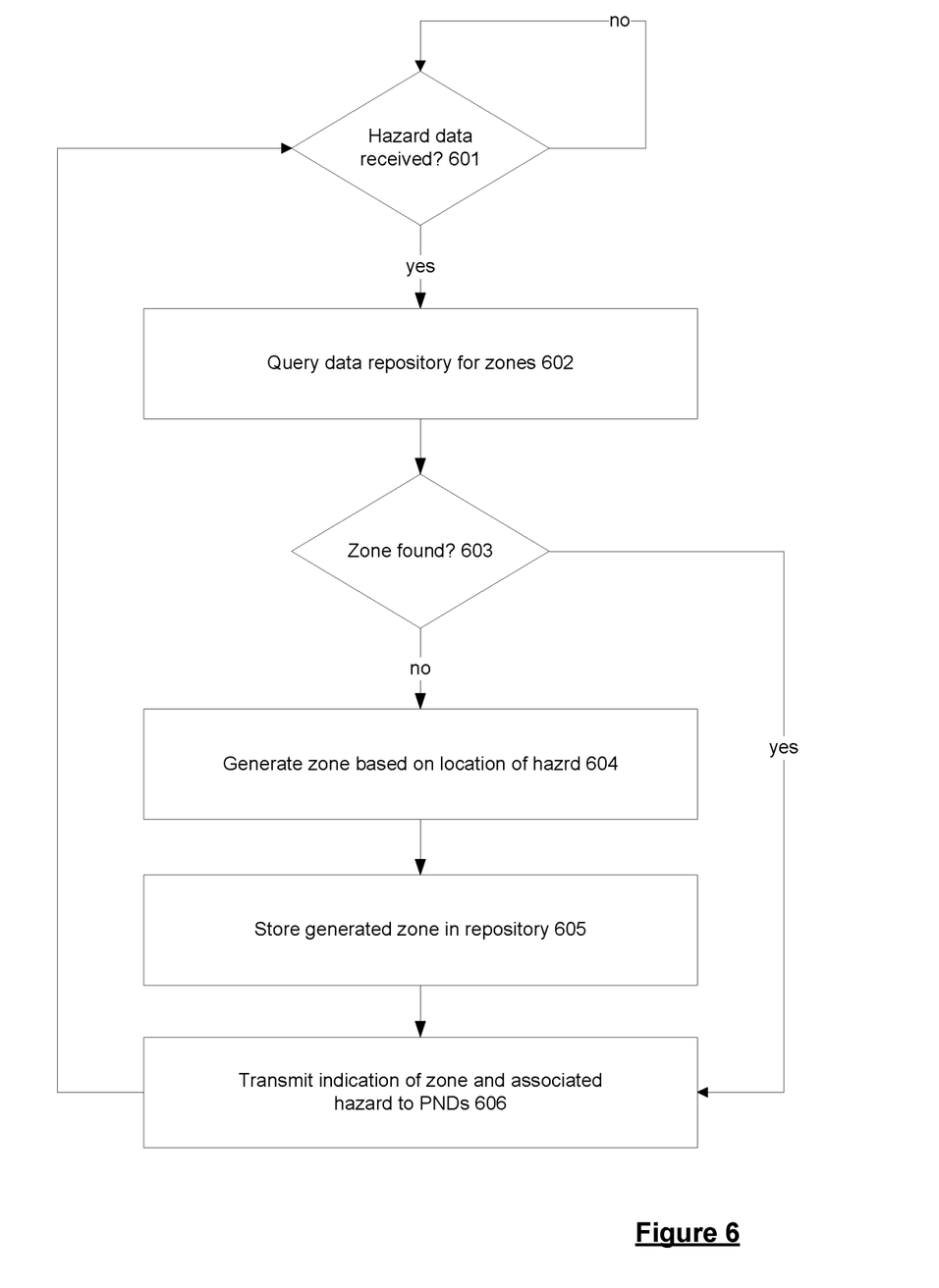
FIG. 6 is a flow diagram process illustrating a process carried out by the server of the system of FIG. 5 generating and maintaining zones of a digital map and associating hazards with zones to provide zonal hazard alerts to users in accordance with embodiments of the invention.

Referring now to FIG. 6, the process performed by zone engine 513 of associating a hazard with a zone and communicating the association to mobile devices 530*a* . . . *n* will now be described in more detail.

At step 601 if data representative of a location of a hazard matched to a location on a digital map in the map database 511 the process moves on to step 602. Otherwise the process loops back to step 601.

At step 602, the zone database 512 is queried to determine at step 603 if the zone database 512 comprises data representative of a zone corresponding to a region of a digital map containing the location of the hazard. If a zone is found, the process continues to step 606 in which the zone engine 513 causes a zonal hazard alert 522 indicative of an association between said zone and said hazard to be transmitted to mobile devices 530*a* . . . *n* which can then alert users to the hazard on the basis of the associated zone.

If, however, the zone database 512 does not comprise data representative of a zone corresponding to a region of a digital map containing the location of the hazard, the process continues to step 604 at which the zone engine 513 generates data representative of a zone corresponding to a region of a digital map containing the location of the hazard. Embodiments of preferred zone generation methodologies will be described below with reference to FIGS. 7 and 8.

After the zone engine 513 has generated a zone at step 604 the zone engine 513 stores the generated data representative of said zone in the zone database 512. In this way, the zone database 512 is populated and kept updated when new hazards that necessitate new zones are reported.

The zone engine 513 then at step 606 causes a zonal hazard alert 522 indicative of an association between said zone and said hazard to be transmitted to mobile devices 530*a* . . . *n* as described above.

On generation or determination of a stored zone with which the hazard should be associated, the zone engine 513 may set values for the attributes associated with said zone based on said hazard. The zonal hazard alert 522 indicative of an association between a zone and a hazard may include the set attributes for the zone. On receipt of the zonal hazard alert 522, mobile devices 530*a* . . . *n* may provide the metadata represented by the attributes to users in the zonal hazard alerts.

In use, the zone engine 513 of the server 302 performs the steps of the method described above with reference to FIG. 6 for plural hazards in real time in response to receipt of data representative of a location of each hazard. The zonal hazard alerts 522 may be transmitted by being broadcast to all mobile devices 530*a* . . . *n*, which may subscribe only to alerts for zones of which they are aware (i.e. have stored locally), or which are within a given distance from the device or from a planned route. The server may instead cause the zonal hazard alerts 522 to be broadcast only in cells of a mobile communication network within a given range of the zone. The server may periodically update zonal hazard alerts to keep the hazard information fresh. The server 302 causes data representative of one or more zones to be transmitted to mobile devices 530*a* . . . *n* based on a current location of the mobile devices 530*a* . . . *n* or a route planned using the mobile devices 530*a* . . . *n*.

An addition or adaptation of the process shown in FIG. 6 is if, at step 604, the zone engine 513 determines that the zone database 512 does not comprise data representative of a zone corresponding to a region of a digital map containing the location of the hazard but the zone engine 513 does determine that the repository does comprise data representative of a zone corresponding to a region of a digital map separated from the location of the hazard by a predetermined distance, the method further comprises the zone engine 513 adjusting the zone to incorporate the location of the hazard and updating the stored data representing the zone.

Preferred methods for generating zones for storage in zone database 512 based on hazard reports 501, 502 will now be described with reference to FIGS. 7 and 8. The zone engine 513 implements an algorithm that creates an artificial (not user-moderated) zone that applies several rules in order to find a zone that covers the location of the reported hazard and is "optimal" towards a rule set.

Thus, generating data representative of a zone corresponding to a region of a digital map containing the location of the hazard at step 604 comprises the zone engine 513 starting from the location of the hazard as a seed location and searching the digital map for a navigable route containing the seed location according to a set of rules for the zone, the route output by the search providing the zone. Searching the digital map for a navigable route containing the seed location comprises the zone engine 513 recursively performing a breadth first search on the network of navigable routes in the digital map for possible routes starting from the seed location while maintaining, for each route during the search, a score value as the sum of any penalty points generated based on the application of a set of search rules to the attributes of the road segments being searched. In a breadth-first search, the search is limited to essentially two operations: (a) visit and inspect a node of a graph; (b) gain access to visit the nodes that neighbour the currently visited node. The breadth-first search begins at a root node and inspects all the neighbouring nodes. Then for each of those neighbour nodes in turn, it inspects their neighbour nodes which were unvisited, and so on.

A search on a route of the possible routes ends in a finished route when the route exceeds a pre-defined path length. The pre-defined path length may be set in dependence on one or more of: the type or types of hazard the zone is to be associated with; whether or not the location is in an urban area; the functional road class. For example, an accident on an arterial road may require a larger zone than a speed camera on a local urban road.

A search on a route of the possible routes is abandoned and the route discarded if: the route turns out to be a dead end; or there already exists a finished route with a less penal score.

If more than one route is output from the search, the finished route having the lowest score is selected as the generated zone. Penalty points are awarded to a route in dependence on one or more of:

the occurrence of a change in functional road class (for example, a change from an arterial road to a local road at a junction turning);
an angle between a road segment and the successor road segment at a junction in the network;
the road segment being part of a roundabout (alternatively, roundabouts may be handled by collapsing them to single nodes in the road network).

All scores are added up to a total score. The weighting of each partial score allows many possibilities for tuning. It can, for example, be tuned if it is more important to stay on the same road class but possibly making more turns or if road class changes are acceptable if favour of fewer turns. As well as penalty points, counteracting positive merit points may be awarded to promote certain features in zones.

Every time the route search advances from one road segment to the next, the internal score is maintained based on penalty points derived from the attributes of the road segments, or respectively their difference in attributes. If, for example, one road-segment has a different road class than its successor, the route will increase the score based on the difference in road class. By choosing the route with the least score at the end of the breadth-first search, the route with the minimal score will be chosen. This way, the algorithm is robust in the sense that it always finds a zone if the road geometry allows it, and the optimal zone will be chosen.

The breadth first search is optimised such that, during searching, the route in the network having the least penal score is continued first. This operation reduces the number of unnecessary searches performed in determining the resulting zone. An example optimised breadth-first search of road segments to generate a zone is illustrated in FIG. 8. It is assumed that there will be normally only a very limited set of meaningful routes. The algorithm tries to find these at first, by continuing the route with the minimal score until it ends (search distance is reached) or there is another route with a lower score. All searches that already have a score that is higher than an already completed search are aborted since they cannot "win" any more (the route with the least score will be chosen). This however implies that the settings in the score configuration are all positive. If for some reason, some attribute should be favoured instead of penalized, which can be easily achieved by giving it a negative score, it can happen that the optimal route in terms of the favoured attribute cannot be found.

Figure 8:
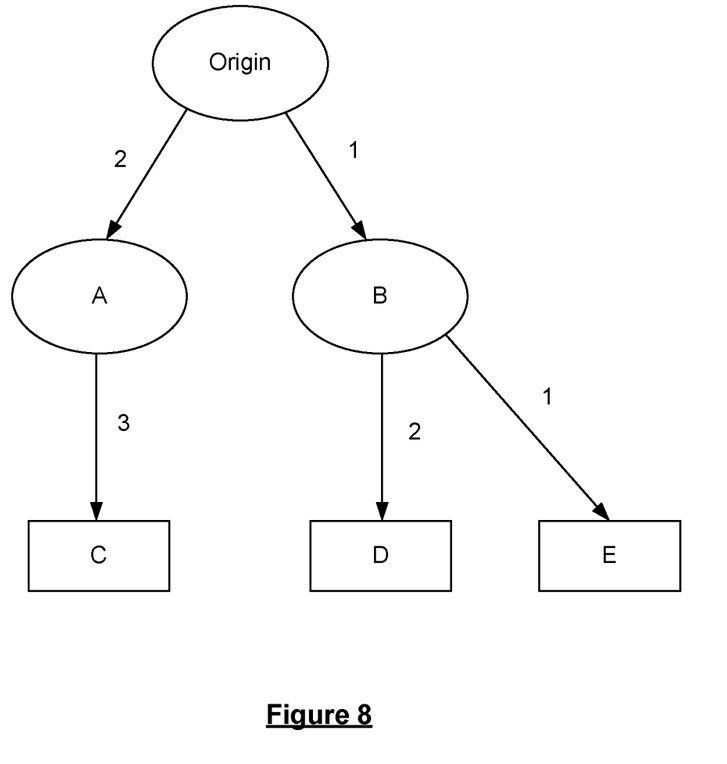
FIG. 8 shows an example illustrating the operation of the optimised breadth-first searching algorithm in searching a graph of a road network when generating a zone in accordance with embodiments of the invention.

FIG. 8 shows an example of how the algorithm searches the graph of the road network. Each link is labelled with the accumulated score. After the routing from Origin (where the hazard location is) to A has been done, the second step is to follow up the route Origin to B. Since that link has the least score, the next step is not to iterate A to C, but B to D or B to E instead. Since the search ends in C, D and E, the routing A→will never be executed because it cannot become better than B to D, B to E. From the finalists, the route with the least score (B to E) is taken as the generated zone.

The road network is searched in the above way for routes in all possible directions from the seed location. The pre-defined path length for a search in a given direction is based on an attribute that defines the relative position of the seed location in the zone. For example, the location of the hazard may be required to be in the middle of the zone, in which case, the pre-determined path length in each possible direction from the seed location is the same. If the hazard type is a speed camera, the direction of the camera may also affect the pre-defined path length.

Figure 7:
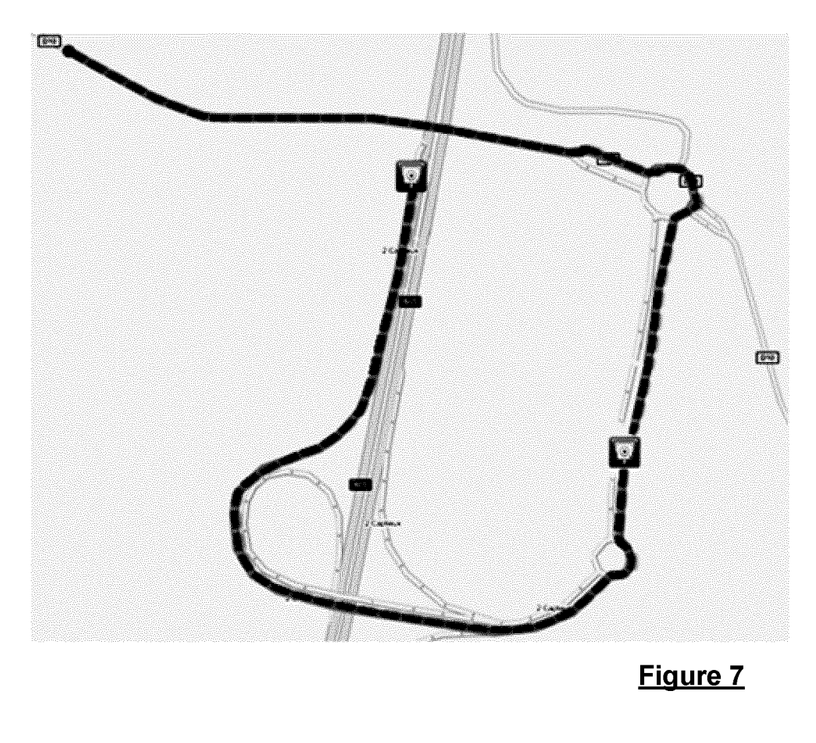
FIG. 7 shows an example zone generated by an embodiment of the invention as a dotted line superimposed on a view of the digital map.

FIG. 7 shows an example zone generated by an embodiment of the claimed invention as a dotted line superimposed on a view of the digital map. The zone was generated for a speed camera hazard having an actual location indicated on the lower-right hand-side of the digital map by searching along possible routes in both directions for a pre-determined path length. The zone and hazard data is provided to mobile devices 530a . . . n by the server 302 causing a zonal hazard alert 522 and zone update 523 to be transmitted. When a mobile device 530a . . . n enters the zone indicated by the black dotted line, the mobile device 530a . . . n provides an auditory/visual alert to the user of the presence of a speed camera hazard in the zone.

When a new camera hazard is reported to zone engine 513 having a location inside the zone indicated by the black dotted line, a new zonal hazard alert 522 is issued by the server 302 indicating an association between the zone and the hazard. There is no limit how many user hazard reports 501 can be associated to one zone as long as the hazard type matches (one of) the zone types permitted for that zone.

As well as storing zones generated by the zone engine 513, the zone database 512 may also store certified zones provided by the authorities of a particular jurisdiction which may be usable for providing zonal warning alerts for hazards of certain types. In regions where certified zones are provided for certain hazard types, the zone generation may not be used for those hazard types.

It should be noted that whilst the accompanying claims set out particular combinations of features described herein, the scope of the present invention is not limited to the particular combinations of hereafter claims, but instead extends to encompass any combination of features or embodiments herein disclosed irrespective of whether or not that particular combination has been specifically enumerated in the accompanying claims at this time.

The invention claimed is:

1. A method of operating a computing device to associate a hazard with a zone of a digital map, the computing device comprising one or more processors and a data repository, the method comprising:

receiving, using said one or more processors, data representative of a location of a hazard matched to a location on a digital map accessible to said computing device;

determining, using said one or more processors, that the data repository does not comprise data representative of a zone corresponding to a region of a digital map containing the location of the hazard;

generating, using said one or more processors, data representative of a zone corresponding to a region of a digital map containing the location of the hazard, the generating comprising:

starting from the location of the hazard as a seed location, searching navigable routes from among a network of navigable routes proceeding away from the seed location in the digital map for a navigable route containing the seed location according to a set of rules for the zone, wherein each navigable route in the network of navigable routes includes a different set of road segments;

selecting, based on a score value accumulated for each of the navigable routes in the network of navigable routes during the searching, a selected navigable route from among the navigable routes in the network of navigable routes; and using the selected navigable route to define the zone, the using comprising adding, to the data representative of the zone, an identification of the selected navigable route;

storing the generated data representative of said zone in the data repository; and transmitting, to one or more mobile devices, a zonal hazard alert, the zonal hazard alert including data indicative of an association between said zone and said hazard, wherein the data indicative of the association between said zone and said hazard includes the identification of the selected navigable route.

2. A method as claimed in claim 1, wherein searching the digital map for a navigable route containing the seed location comprises:

recursively performing a breadth first search on the network of navigable routes in the digital map for possible routes starting from the seed location;

maintaining, for each route during the search, a score value as the sum of any penalty points generated based on the application of a set of search rules to the attributes of the road segments being searched; and, if more than one route is output from the search, selecting the finished route having a lowest score value as the zone.

3. A method as claimed in claim 2, wherein penalty points are awarded to a route in dependence on one or more of:

the occurrence of a change in functional road class;

an angle between a road segment and the successor road segment at a junction in the network; and the road segment being part of a roundabout.

4. A method as claimed in claim 2, wherein a search on a route of the possible routes ends in a finished route when the route exceeds a pre-defined path length.

5. A method as claimed in claim 4, wherein the pre-defined path length is set in dependence on one or more of: the type or types of hazard the zone is to be associated with; whether or not the location is in an urban area; the functional road class.

6. A method as claimed in claim 4, wherein the pre-defined path length for a search in a given direction is based on an attribute that defines the relative position of the seed location in the zone and, optionally, if the hazard is a speed camera, the direction of the camera.

7. A method as claimed in claim 1, wherein the road network is searched for routes in all possible directions from the seed location.

8. A method as claimed in claim 1, further comprising, determining that the repository comprises data representative of a zone corresponding to a region of a digital map separated from the location of the hazard by less than a predetermined distance and adjusting that zone to incorporate the location of the hazard and updating the stored data representing the zone.

9. A method as claimed in claim 1, wherein the data representative of a zone stored in the data repository each indicate types of hazard with which that zone can be associated.

10. A method claimed in claim 9, wherein, when determining if the repository comprises data representative of a zone corresponding to a region of a digital map containing the location of the hazard, the computing device further bases said determination on data representative of the type of the hazard and an indication for each stored zone of the types of hazard with which that zone can be associated.

11. A method as claimed in claim 1, wherein the hazard comprises at least one of a set of hazard types including: fixed speed cameras, mobile speed cameras, average speed checks, red light cameras, accident reports, traffic jams, restricted traffic areas, weather hazards, ice, flooding, snow, rockfalls, landslides, and avalanches.

12. A method as claimed in claim 1, wherein a mobile device, in receipt of data indicative of an association between a zone and a hazard, provides an indication signal alerting the user to said hazard in relation to said zone.

13. A method as claimed in claim 12, wherein said indication signal is provided to said user based on a current location of said device in proximity to said zone.

14. A method as claimed in claim 1, wherein each data representative of a zone has associated attributes, the method further comprising the computing device setting values for the attributes associated with said zone based on said hazard.

15. The method of claim 1, wherein, transmitting, to the one or more mobile devices, the zonal hazard alert comprises:

for each of the one or more mobile devices:
receiving, from that mobile device, an indication of a current location of that mobile device; and
transmitting the zonal hazard alert only when the current location of that mobile device is within a specified distance of the navigable route defining the zone.

16. The method of claim 1, wherein, transmitting, to the one or more mobile devices, the zonal hazard alert comprises:

for each of the one or more mobile devices:
receiving, from that mobile device, an indication of a planned route of that mobile device; and
transmitting the zonal hazard alert only when the planned route of that mobile device is within a specified distance of the navigable route defining the zone.

17. A method of operating a computing device to associate a hazard with a zone of a digital map, the computing device comprising one or more processors and a data repository, the method comprising:

receiving, using said one or more processors, data representative of a location of a hazard matched to a location on a digital map accessible to said computing device;

determining, using said one or more processors, that the data repository does not comprise data representative of a zone corresponding to a region of a digital map containing the location of the hazard;

when the data repository does not comprise data representative of a zone corresponding to a region of a digital map within a predetermined distance of the location of the hazard, generating, using said one or more processors, data representative of a zone corresponding to a region of a digital map containing the location of the hazard, the generating comprising:

starting from the location of the hazard as a seed location, searching navigable routes from among a network of navigable routes proceeding away from the seed location in the digital map for a navigable route containing the seed location according to a set of rules for the zone, wherein each navigable route in the network of navigable routes includes a different set of road segments;

selecting, based on a score value accumulated for each of the navigable routes in the network of navigable routes during the searching, a selected navigable route from among the navigable routes in the network of navigable routes; and using the selected navigable route to define the zone, the using comprising adding, to the data representative of the zone, an identification of the selected navigable route;

storing the generated data representative of said zone in the data repository;

when the data repository comprises data representative of a zone corresponding to a region of a digital map within the predetermined distance of the location of the hazard, adjusting, using said one or more processors, the zone to incorporate the location of the hazard and updating stored data representing the zone; and transmitting, to one or more mobile devices, a zonal hazard alert, the zonal hazard alert including data indicative of an association between said zone and said hazard, wherein the data indicative of the association between said zone and said hazard includes the identification of the selected navigable route.

18. A computing device arranged to associate a hazard with a zone of a digital map, comprising:

a memory, the memory storing a data repository; and one or more processors, the one or more processors being arranged to:

receive data representative of a location of a hazard matched to a location on a digital map accessible to said computing device;

determine that the data repository does not comprise data representative of a zone corresponding to a region of a digital map containing the location of the hazard; and generate data representative of a zone corresponding to a region of a digital map containing the location of the hazard, the generating comprising:

starting from the location of the hazard as a seed location, searching navigable routes from among a network of navigable routes proceeding away from the seed location in the digital map for a navigable route containing the seed location according to a set of rules for the zone, wherein each navigable route in the network of navigable routes includes a different set of road segments;

selecting, based on a score value accumulated for each of the navigable routes in the network of navigable routes during the searching, a selected navigable route from among the navigable routes in the network of navigable routes; and using the selected navigable route to define the zone, the using comprising adding, to the data representative of the zone, an identification of the selected navigable route;

store the generated data representative of said zone in the data repository; and transmit, to one or more mobile devices, a zonal hazard alert, the zonal hazard alert including data indicative of an association between said zone and said hazard, wherein the data indicative of the association between said zone and said hazard includes the identification of the selected navigable route.

19. A computing device arranged to associate a hazard with a zone of a digital map, comprising:

a memory, the memory storing a data repository; and one or more processors, the one or more processors being arranged to:

receive data representative of a location of a hazard matched to a location on a digital map accessible to said computing device;

determine that the data repository does not comprise data representative of a zone corresponding to a region of a digital map containing the location of the hazard;

when the data repository does not comprise data representative of a zone corresponding to a region of a digital map within a predetermined distance of the location of the hazard, generate, using said one or more processors, data representative of a zone corresponding to a region of a digital map containing the location of the hazard, the generating comprising:

starting from the location of the hazard as a seed location, searching navigable routes from among a network of navigable routes proceeding away from the seed location in the digital map for a navigable route containing the seed location according to a set of rules for the zone, wherein each navigable route in the network of navigable routes includes a different set of road segments;

selecting, based on a score value accumulated for each of the navigable routes in the network of navigable routes during the searching, a selected navigable route from among the navigable routes in the network of navigable routes; and using the selected navigable route to define the zone, the using comprising adding, to the data representative of the zone, an identification of the selected navigable route;

store the generated data representative of said zone in the data repository;

when the data repository comprises data representative of a zone corresponding to a region of a digital map within the predetermined distance of the location of the hazard, adjusting the zone to incorporate the location of the hazard and updating stored data representing the zone; and transmit, to one or more mobile devices, a zonal hazard alert, the zonal hazard alert including data indicative of an association between said zone and said hazard, wherein the data indicative of the association between said zone and said hazard includes the identification of the selected navigable route.

20. A non-transitory computer readable medium comprising instructions which, when executed by a computing device comprising one or more processors and a data repository, cause the computing device to carry out a method for associating a hazard with a zone of a digital map, the method comprising:

receiving data representative of a location of a hazard matched to a location on a digital map accessible to said computing device;

determining that the data repository does not comprise data representative of a zone corresponding to a region of a digital map containing the location of the hazard;

generating, using said one or more processors, data representative of a zone corresponding to a region of a digital map containing the location of the hazard, the generating comprising:

starting from the location of the hazard as a seed location, searching navigable routes from among a network of navigable routes proceeding away from the seed location in the digital map for a navigable route containing the seed location according to a set of rules for the zone, wherein each navigable route in the network of navigable routes includes a different set of road segments;

selecting, based on a score value accumulated for each of the navigable routes in the network of navigable routes during the searching, a selected navigable route from among the navigable routes in the network of navigable routes; and using the selected navigable route to define the zone, the using comprising adding, to the data representative of the zone, an identification of the selected navigable route;

storing the generated data representative of said zone in the data repository; and transmitting, to one or more mobile devices, a zonal hazard alert, the zonal hazard alert including data indicative of an association between said zone and said hazard, wherein the data indicative of the association between said zone and said hazard includes the identification of the selected navigable route.

* * * * *